(12) United States Patent
Holostov et al.

(10) Patent No.: US 8,732,797 B2
(45) Date of Patent: May 20, 2014

(54) HOST USABILITY AND SECURITY VIA AN ISOLATED ENVIRONMENT

(75) Inventors: Vladimir Holostov, Redmond, WA (US); Yigal Edery, Redmond, WA (US); Yair Geva, Zichron Yaakov (IL)

(73) Assignee: Microsoft Corporation, Redmond, WA (US)

( * ) Notice: Subject to any disclaimer, the term of this patent is extended or adjusted under 35 U.S.C. 154(b) by 438 days.

(21) Appl. No.: 12/871,919

(22) Filed: Aug. 31, 2010

(65) Prior Publication Data

US 2012/0054829 A1 Mar. 1, 2012

(51) Int. Cl.
*G06F 11/00* (2006.01)

(52) U.S. Cl.
USPC ............... 726/3; 702/179; 702/188; 713/165; 713/167; 713/188; 715/734; 715/736; 380/2

(58) Field of Classification Search
USPC ............... 726/3; 702/179, 188; 713/165, 167, 713/188; 715/734, 736; 380/2
See application file for complete search history.

(56) References Cited

U.S. PATENT DOCUMENTS

| | | | | |
|---|---|---|---|---|
| 5,974,549 | A * | 10/1999 | Golan | 726/23 |
| 6,609,153 | B1 * | 8/2003 | Salkewicz | 709/223 |
| 6,836,888 | B1 * | 12/2004 | Basu et al. | 718/104 |
| 6,934,881 | B2 * | 8/2005 | Gold et al. | 714/15 |
| 7,076,801 | B2 * | 7/2006 | Gong et al. | 726/11 |
| 7,213,265 | B2 * | 5/2007 | Dapp | 726/23 |
| 7,281,039 | B1 * | 10/2007 | Salkewicz | 709/223 |
| 7,441,272 | B2 * | 10/2008 | Durham et al. | 726/23 |
| 7,908,395 | B1 * | 3/2011 | Salkewicz | 709/238 |
| 8,042,120 | B2 * | 10/2011 | Laborczfalvi et al. | 719/320 |
| 8,230,480 | B2 * | 7/2012 | Fazal et al. | 726/2 |
| 8,234,705 | B1 * | 7/2012 | Roskind et al. | 726/22 |
| 8,245,294 | B1 * | 8/2012 | Zahra et al. | 726/22 |
| 2002/0053044 | A1 * | 5/2002 | Gold et al. | 714/38 |
| 2002/0059528 | A1 * | 5/2002 | Dapp | 713/201 |
| 2002/0188870 | A1 * | 12/2002 | Gong et al. | 713/201 |
| 2003/0037263 | A1 | 2/2003 | Kamat et al. | |
| 2003/0208606 | A1 * | 11/2003 | Maguire et al. | 709/227 |
| 2005/0050336 | A1 * | 3/2005 | Liang et al. | 713/188 |
| 2005/0204162 | A1 * | 9/2005 | Rayes et al. | 713/201 |
| 2005/0246767 | A1 * | 11/2005 | Fazal et al. | 726/11 |

(Continued)

OTHER PUBLICATIONS

"Virtual Desktop infrastructure for Hospitals", Retrieved at <<http://rdpdesk.com/solutions/2 of>>, retrieved date :Jul. 5, 2010.

(Continued)

*Primary Examiner* — Kambiz Zand
*Assistant Examiner* — Sharif E Ullah
(74) *Attorney, Agent, or Firm* — Ben Tabor; Kate Drakos; Micky Minhas (57) ABSTRACT

Architecture that addresses security concerns while still providing transparent user experience with ability to perform tasks. When a user machine is considered incompliant or compromised due to, for example, a suspected infection, the user machine can be blocked from further access to a network or other computing hosts until the incompliance is resolved. A notification is presented that indicates the nature of the problem, and a way to access an automatically configured isolated environment via which to continue working. The user can be automatically routed to use the alternative isolated environment for temporary access to network resources. Once the user finishes activities in the isolated environment, the system hosting the isolated environment is reverted back to a known good state.

20 Claims, 6 Drawing Sheets

(56) References Cited

U.S. PATENT DOCUMENTS

| | | | |
|---|---|---|---|
| 2006/0005245 A1* | 1/2006 | Durham et al. | 726/25 |
| 2006/0075381 A1 | 4/2006 | Laborczfalvi et al. | |
| 2006/0085789 A1* | 4/2006 | Laborczfalvi et al. | 718/100 |
| 2006/0190410 A1 | 8/2006 | Harper | |
| 2006/0190606 A1 | 8/2006 | Kohavi | |
| 2006/0277311 A1 | 12/2006 | Franco et al. | |
| 2008/0016339 A1* | 1/2008 | Shukla | 713/164 |
| 2008/0034072 A1 | 2/2008 | He et al. | |
| 2008/0066143 A1* | 3/2008 | Charles Tai et al. | 726/1 |
| 2011/0004680 A1* | 1/2011 | Ryman | 709/224 |
| 2011/0029775 A1* | 2/2011 | Sakai et al. | 713/171 |
| 2011/0314542 A1* | 12/2011 | Viswanathan et al. | 726/23 |

OTHER PUBLICATIONS

Cochran, Jerry, "Secure Messaging Solutions for Exchange", Retrieved at <<http://www.windowsitpro.com/article/encryption2/secure-messaging-solutions-for-exchange.aspx>>, Jan. 31, 2001.

\* cited by examiner

HOST USABILITY AND SECURITY VIA AN ISOLATED ENVIRONMENT

BACKGROUND

Security applications are inherently designed to protect the assets by using preventive measures that, for example, block the user from accessing all or specific Internet sites and disconnect the user machine from the corporate network based on an automatic response to incompliance, or execute other intrusive responses to security threats that might be beneficial for organization security but have significant negative impact on user experience and cause users to seek ways to bypass or neutralize the security measures. Existing security applications do not offer substantial mitigation besides contact information of network administrator and, in some cases, a brief explanation.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture provides a solution that addresses security concerns while still providing transparent experience with the ability to perform tasks (e.g., business). More specifically, when a user machine is considered incompliant or compromised due to, for example, a suspected infection, the user machine can be blocked from further access to a network or other computing hosts until the incompliance is resolved. The security architecture may block the user machine from accessing certain critical resources such as LOB (line-of-business) applications, Internet sites, etc., or simply disconnect the incompliant machine from the company network.

In the mean time, the architecture facilitates presentation of a notification on the user machine that indicates to the user the nature of the problem. The user is also presented with a way to access an automatically configured isolated environment via which to continue working. The user can be automatically and transparently be routed to use the alternative isolated environment for temporary access to network resources (e.g., enterprise resources such as LOB resources, and/or Internet resources).

The isolated environment can be remote desktop hosted on a dedicated server, a local virtual desktop that is isolated from the user's regular host, or any other variation of a secure isolated environment. This approach ensures that the user will be able to carry out business goals uninterrupted by security measures and without compromising the integrity of corporate assets. Once the user finishes activities in the isolated environment, the system hosting the isolated environment is reverted back to a known good state. The implementation of the isolated environment also minimizes the risk to compromising the user's system while browsing to potentially dangerous destinations, and performs the inspection of traffic between a compromised and isolated environment for malware and intrusion attempts.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

In the disclosed architecture, when a user machine (e.g., a computing host) is considered incompliant, the security system can block the user machine from accessing certain critical resources such as LOB (line-of-business) applications, Internet sites, or disconnect the machine completely from the network (e.g., corporate). Note that incompliance means that the machine might become compromised if an event or action is allowed to occur, or has already been compromised, depending on the type of incompliance. For example, the incompliance includes but is not limited to, missing security patches, infection, non-compliant applications, abnormal network activity, intrusion attempts, etc. The user is automatically routed to use an alternative isolated environment of a remote computing host that can be used for temporary access to a network entity such as LOB or Internet resources.

The remote computing host can be a remote desktop hosted on a dedicated server, a local virtual desktop that is isolated from the user's regular host, or any other variation of a secure isolated environment. This approach ensures that the user will be able to carry out the desired business goals uninterrupted by security measures in place and without risking to compromise the integrity of corporate assets. Once the user finishes interacting (e.g., browsing) in the isolated environment, the system hosting the isolated environment is reverted back to a known good state.

Another application of this architecture is using the isolated environment for minimizing the risk to compromise the user's system while browsing to potentially dangerous destinations even when the user machine is compliant.

A component of the disclosed architecture, terminal services, streamlines the user experience during network quarantine or when security preferences do not allow browsing to network entity (e.g., remote website) the user wants to access. The remote application publishing feature of terminal services is utilized in order to provide a seamless browsing experience. The user is presented with a familiar environment and enables the user to continue carrying business tasks through integration between access policies, content served to the client, user identity, as well as introduction of helper mechanisms for secure transmission of documents.

The disclosed architecture provides a transparent or semi-automatic switching of experience between using the "regular host" of the user and the isolated environment. Integration is provided between gateway access policies, security reputation of browsed destinations, and the system automatically spawning the isolated environment, and optionally, a network monitoring system that can inspect traffic between the compromised machines and the isolated environment. Integration can also be provided between security system response related to endpoint status and a system that spawns the isolated environment. A monitored (and possibly secure) channel is established for transferring business-critical content between the compromised machine and isolated environment. The format of data downloaded to a compromised machine makes it difficult to leak such data since the channel is inspected. Files moved from a compromised machine to the isolated environment are inspected for malware, anomalies, intrusion attempts, etc. This inspection can include the blocking of certain file types (e.g., executables) as well. The disclosed architecture also benefits those cases were regulation prohibits from having machine running LOB applications to connect directly to the Internet, for example.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
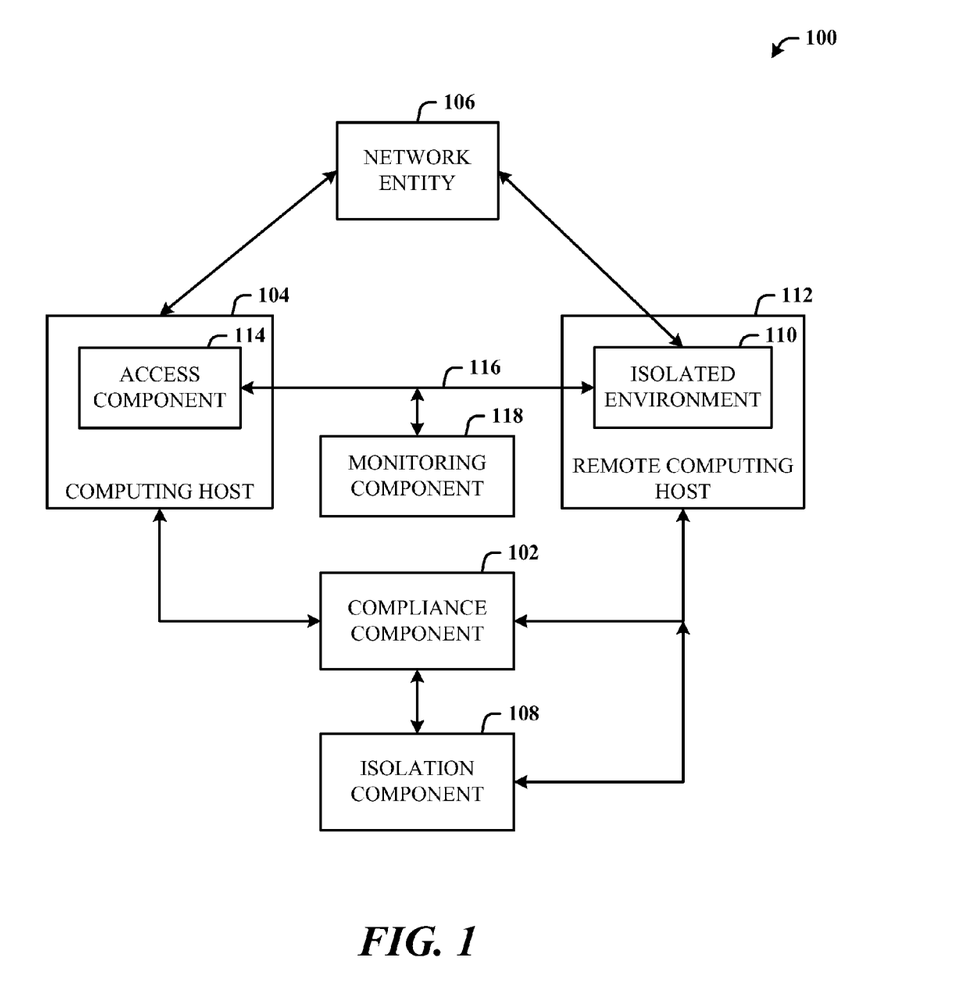
FIG. 1 illustrates a security system in accordance with the disclosed architecture.

FIG. 1 illustrates a security system 100 in accordance with the disclosed architecture. The system 100 includes a compliance component 102 that monitors a computing host 104 for incompliant operations and state (e.g., missing security patch, infection, outdated or prohibited software, etc.) when attempting to access a network entity 106. An isolation component 108 automatically creates an isolated environment 110 in response to detection of the computing host 104 being an incompliant computing host. The isolated environment 110 can be created in association with a remote computing host 112. Note that although the isolated environment 110 is depicted as created in the remote computing host 112, it is to be understood that alternatively, the isolated environment 110 can be created in the computing host 104 using virtualization (virtual machines). Thus, the remote host 112 can be considered optional. An access component 114 facilitates monitored interactive access with the network entity 106 via the isolated environment 110 of the remote computing host 112. The access component 114 can automatically and transparently route the user of the computing host to the isolated environment to facilitate interactive access with the network entity via the isolated environment. This routing can be performed with minimal impact on the user experience.

The isolated environment 110 is created temporarily for access to the network entity 106 via the access component 114, and the isolated environment 110 is destroyed when the access is no longer requested. The incompliant computing host (computing host 104) is blocked from establishing a connection to another computing host, which may or may not be on a network, and a network. The isolation component 108 creates the isolated environment 110 within a predetermined time of when the compliance component 102 determines the computing host 104 to be the incompliant computing host. The compliance component 102 determines incompliance of the computing host 104 based on at least one of gateway access policies, security reputation of the network entity, or characteristics of the remote computing host 112.

Figure 2:
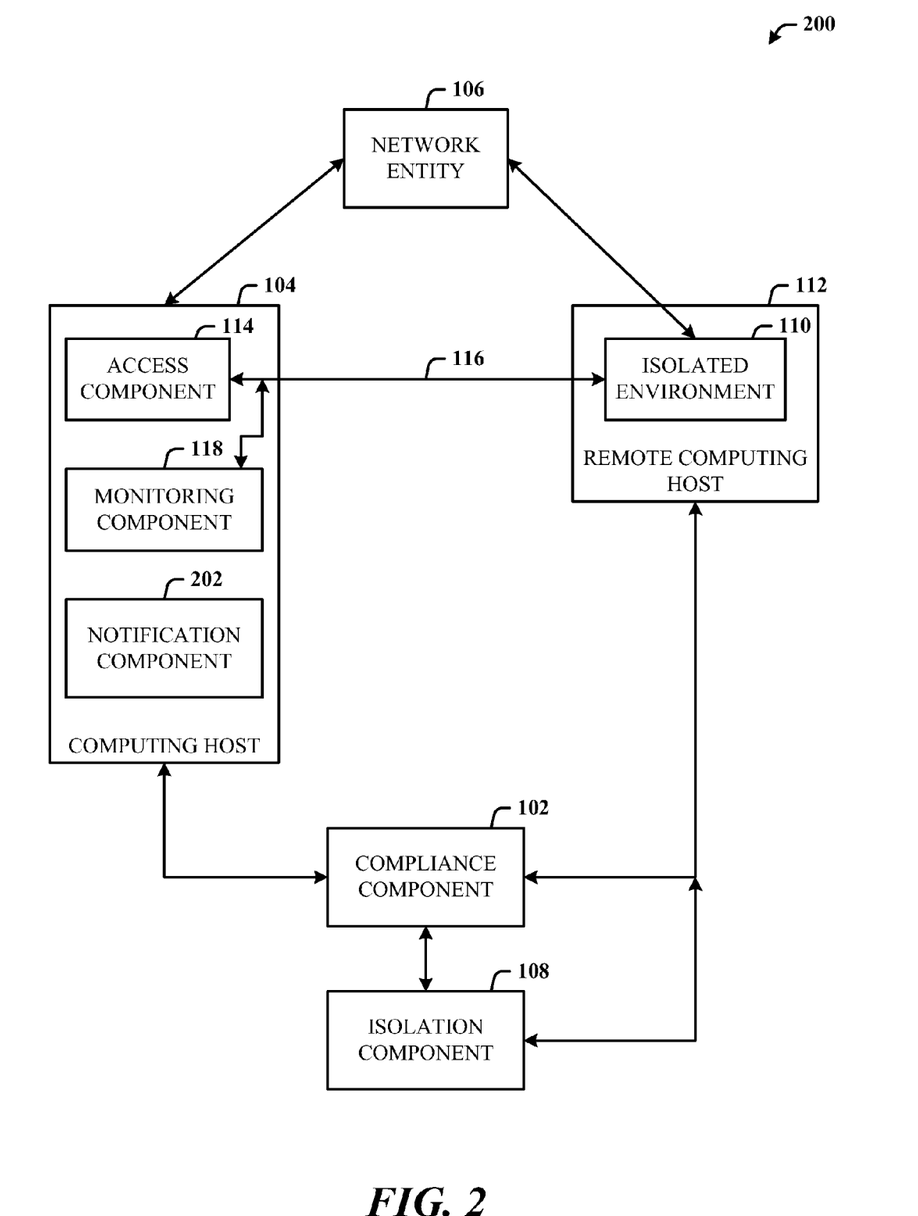
FIG. 2 illustrates an alternative embodiment of a security system having a notification component.

The system 100 further comprises a monitored communications channel 116 implemented between the incompliant computing host (the computing host 104) and the isolation environment 110 for monitoring (traffic, in general) and transferring content between the incompliant computing host and the isolated environment 110. The monitoring function can be performed using a channel monitoring component 118. The monitoring component 118 is depicted external to the computing host 104, in this embodiment; however, the monitoring component 118 can be part of the computing host 104, as shown in FIG. 2. The monitored communications channel 116 can be under continued or intermittent inspection for undesirable traffic and communications. The remote computing host 112 can be a gateway that hosts the isolated environment 110. The remote computing host 112 can be a client machine that receives a virtual desktop pre-provisioned to a user. The isolated environment 110 can be configured to receive only a restricted set of file types from the incompliant computing host for interacting with the network entity 106 via a terminal service.

FIG. 2 illustrates an alternative embodiment of a security system 200 having a notification component 202. The system 200 includes the compliance component 102 that monitors the computing host 104 for incompliant operations when attempting to access the network entity 106, the isolation component 108 that automatically creates the isolated environment 110 in response to detection of the computing host 104 being an incompliant computing host (the isolated environment 110 created in association with the remote computing host 112, the monitored communications channel 116 implemented between the incompliant computing host and the isolated environment 110 for transferring content between the incompliant computing host and the isolated environment 110, and the access component 114 that facilitates monitored interactive access with the network entity 106 via a terminal service connection to the isolated environment 110 of the remote computing host 112.

The isolated environment 110 is created temporarily for access to the network entity 106 via the terminal service connection, and the isolated environment 110 is destroyed when the access is no longer requested. The incompliant computing host (computing host 104) is blocked from establishing a connection to another computing host. The incompliant computing host sends a restricted set of file types to the remote computing host 112 for processing to access the network entity 106 and the file types are inspected for malware and content compliance.

The isolation component 108 creates the isolated environment 110 within a predetermined time of when the compliance component 102 determines the computing host 104 to be the incompliant computing host.

The system 200 further comprises the notification component 202 that presents a notification of incompliance and an embedded remote desktop window for accessing the isolated environment 110 and interacting with the network entity 106 via the isolated environment 110. Notification can be accomplished as a client component pre-installed on the compromised machine or through a browser notification, for example. In this system 200, the monitoring component 118 is shown as part of the computing host 104 to monitor traffic on the communications channel 116.

Figure 3:
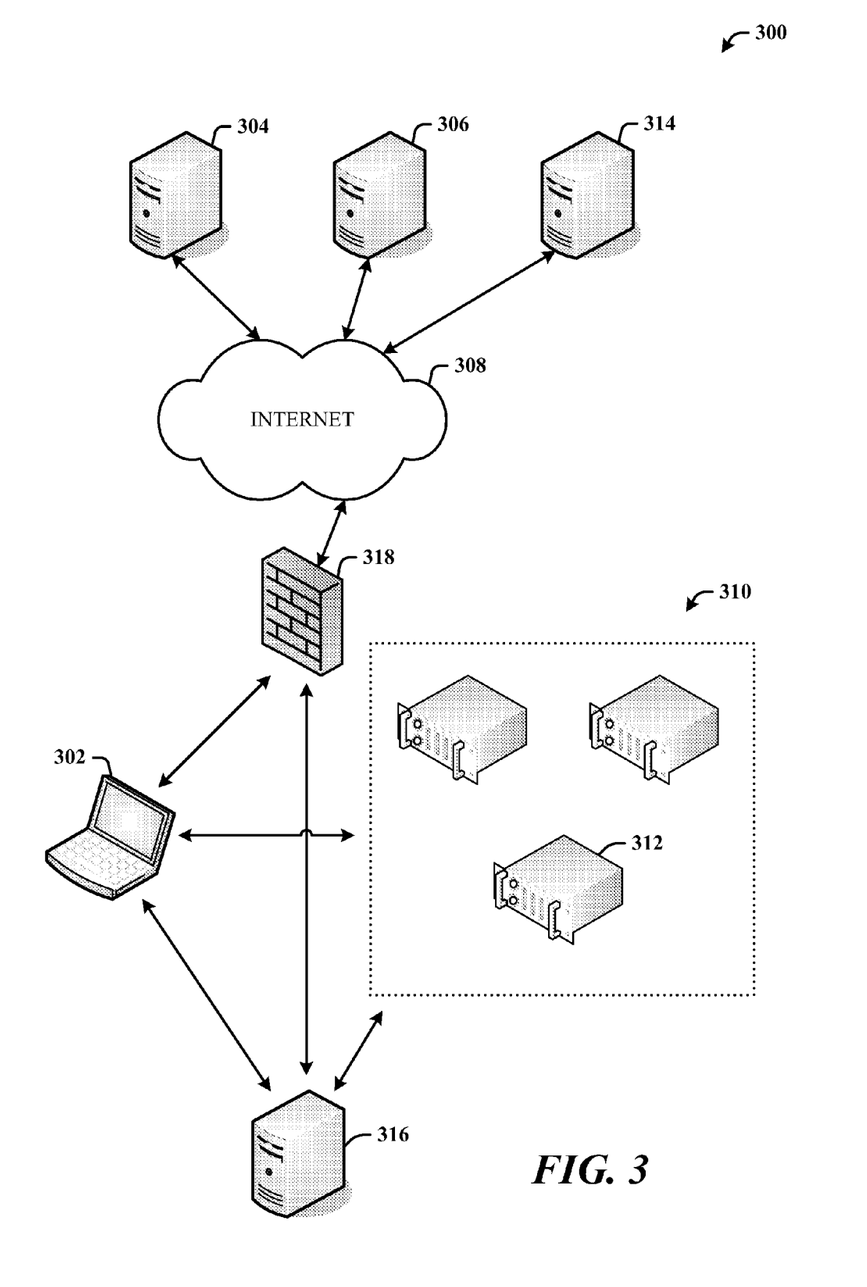
FIG. 3 illustrates an alternative embodiment of a security system that mitigates the negative impact caused by security measures.

FIG. 3 illustrates an alternative embodiment of a security system 300 that mitigates the negative impact caused by security measures. Elements of the disclosed architecture include a "hardened" (isolated environment) quarantine server that allows the impacted user to continue working while the user machine is blocked from the network(s) (e.g., corpnet, Internet, etc.) due to incompliance or suspected infection, and integration between the network infrastructure and the quarantine server that restricts the suspect machines to a limited set of activities and provides a smooth experience to the user. The quarantine server also provides access to resources considered potentially dangerous such as network sites with a reputation for having problems with malware, for example.

Once the user machine is found incompliant or infected, the user is provided a notification that the user machine is blocked, and specific instructions as to how to resolve the problem. In some cases, the short-term activities (e.g., business needs) will take precedence over troubleshooting, for example, the user needs to send a document to colleagues by 9 AM, and in this case, the user connects to a remote desktop hosted on a dedicated, hardened quarantine server.

In one notification embodiment, the user is presented with a webpage that includes a brief introduction and necessary help links, an embedded terminal services window that connects to the quarantine server, and simple interface for transferring the files the user may need in isolated environment in a secure and monitored manner (e.g., the presentation the user needs to send in order to meet a deadline).

When the user connects to the quarantine server using the embedded terminal window, the server can spawn a virtual machine (e.g., the isolated environment 110) that includes the necessary applications and performs the user login. The virtual machine can be part of a shadow domain (to promise isolation), and there is a mapping between the user identity on the corporate domain and the user on the shadow domain. The user is allowed to copy a limited set of file types from the blocked machine to the quarantine server by routing all communications channel traffic through a network inspection component that can include filters or policies that impose the desired restriction requirements (e.g., file types). Moreover, the network inspection component can inspect all traffic using IPS (intrusion prevention system) and malware engines. After performing the desired actions (e.g., editing and sending the documents), the user logs out, and the virtual machine is destroyed as soon as the session ends.

In alternative embodiments, the quarantine server can be hosted on a gateway using, for example, a terminal services broker service. Alternatively or in combination therewith, and array of quarantine servers can be deployed in the corpnet. Still alternatively, a virtual desktop is downloaded to the client machine that is automatically or manually pre-provisioned to the user and used instead of a central quarantine server.

Referring again to FIG. 3 and using a practical usage example, after normal work hours, the security system 300 detects user machine 302 (similar to the computing host 104 of FIG. 1) is initiating too many connections per second to remote Internet servers (304 and 306), an activity usually associated with malware infection. According to configured policies, the security system 300 disconnects the user machine 302 from both the Internet 308 and corpnet 310.

When the user arrives at work the following morning to make a last minute update to a presentation to be given, the user discovers that the needed access to local file server 312 or Internet site 314 is denied, and the network administrator will not arrive to work in time to address the problem.

An error notification is presented to the user when attempting to access the Internet site 314, and includes an explanation of what happened and an embedded remote desktop window through which the user can access a dedicated quarantine server 316 (similar to remote computing host 112 of FIG. 1). Alternatively, the user can be automatically routed through server 316 with minimal impact and maximum transparency. The server 316 spawns a virtual machine (similar to isolated environment 110 of FIG. 1) that includes the necessary applications installed and allows the user to perform most common tasks such as browsing the Internet, editing office documents, and sending email, for example. The user can also upload files from the suspect user machine 302 (e.g., incompliant computing host) to the quarantine server 316. These files undergo inspection for malware and content compliance to prevent the spread of malicious content from the suspect user machine 302. The suspect user machine 302 is not allowed to communicate with any machine in the corpnet 310 other than the quarantine server 316.

An alternative embodiment prevents direct access between the suspect user machine 302 and the quarantine server 316 by routing access through a gateway associated with a firewall 318.

In a second usage example, the user machine 302 is healthy (compliant) and the user attempts to access a website 304 that is wrongly categorized as malicious by the firewall 318. As in the above usage example, the notification presented to the user includes an embedded remote desktop window to the quarantine server 316. The server 316 spawns a virtual machine to allow the user access to the desired Internet sites (e.g., Internet site 314), while all connections are logged and all content is scanned by multiple IPS and malware inspection engines to prevent security incidents.

Once the user logs out or the session terminates or expires, the virtual machine is destroyed. In an alternative embodiment, the virtual machine can be spawned on user machine 302 following a response from the gateway associated with the firewall 318.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of inter-related states or events, such as in a state diagram. Moreover, not all acts illustrated in a methodology may be required for a novel implementation.

Figure 4:
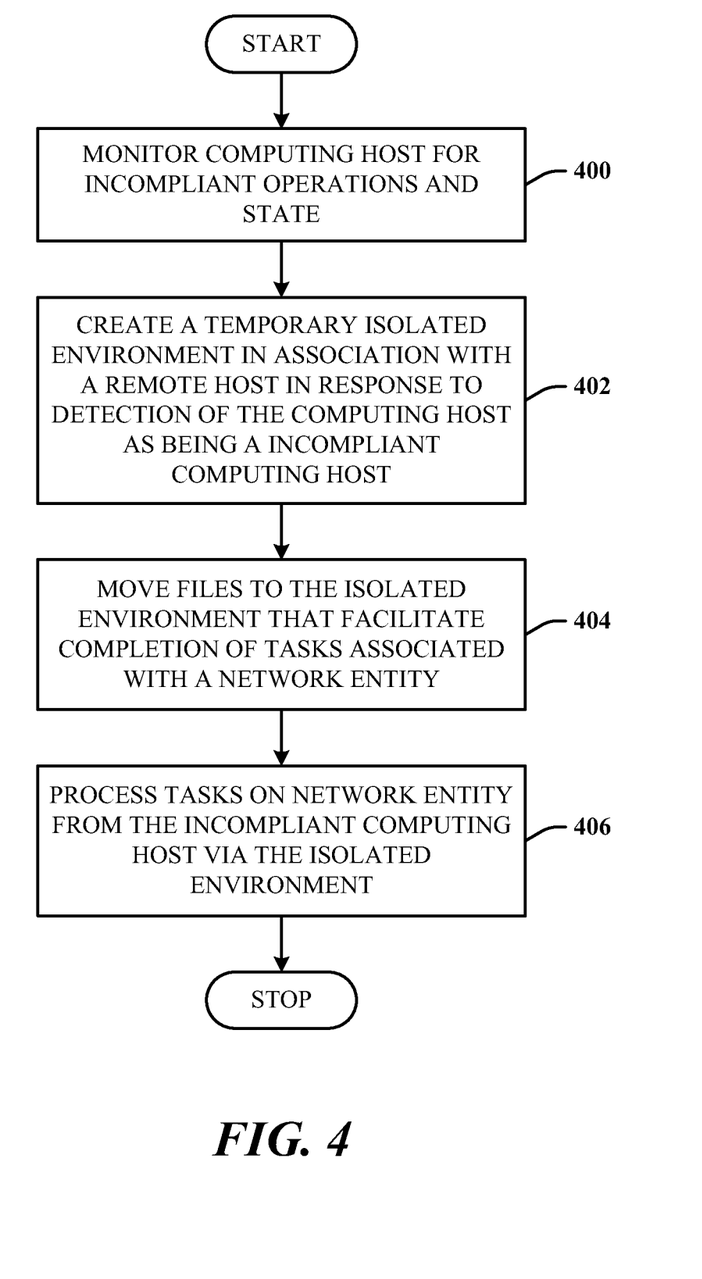
FIG. 4 illustrates a computer-implemented security method in accordance with the disclosed architecture.

FIG. 4 illustrates a computer-implemented security method in accordance with the disclosed architecture. At 400, a computing host is monitored for incompliant operations. At 402, a temporary isolated environment is created in association with a remote host in response to detection of the computing host as being an incompliant computing host. At 404, files can be moved to the isolated environment that facilitate completion of tasks associated with a network entity. At 406, the tasks are processed on the network entity from the incompliant computing host via the isolated environment.

Figure 5:
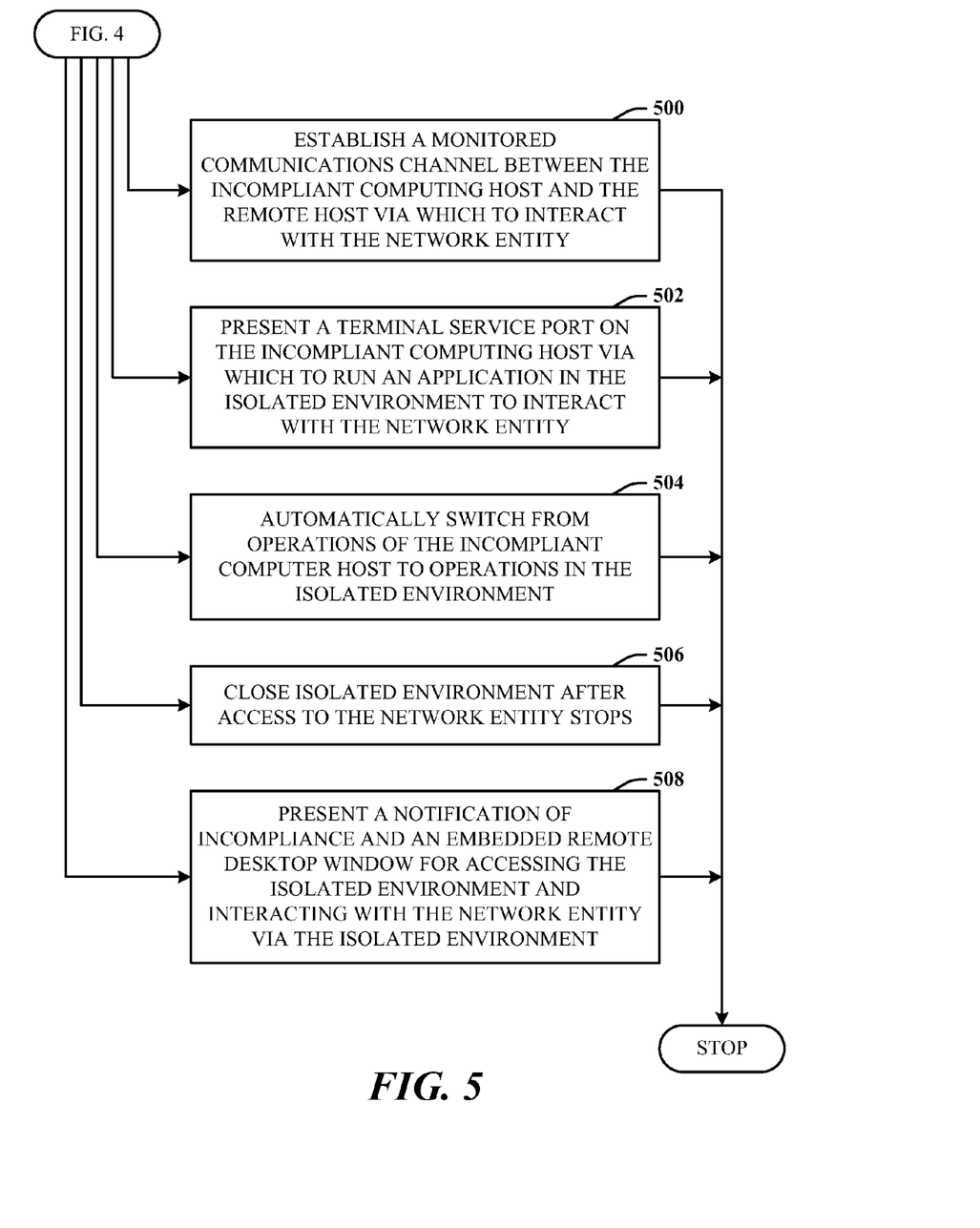
FIG. 5 illustrates further aspects of the method of FIG. 4.

FIG. 5 illustrates further aspects of the method of FIG. 4. Note that the arrowing indicates that each block represents a step that can be included, separately or in combination with other blocks, as additional aspects of the method represented by the flow chart of FIG. 4. At 500, a monitored communications channel is established between the incompliant computing host and the remote host via which to interact with the network entity. At 502, a terminal service port is presented on the incompliant computing host via which to run an application in the isolated environment to interact with the network entity. At 504, automatically switching is performed from operations of the incompliant computer host to operations in the isolated environment. At 506, the isolated environment is closed after access to the network entity stops. At 508, a notification of incompliance and an embedded remote desktop window are presented for accessing the isolated environment and interacting with the network entity via the isolated environment.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 6:
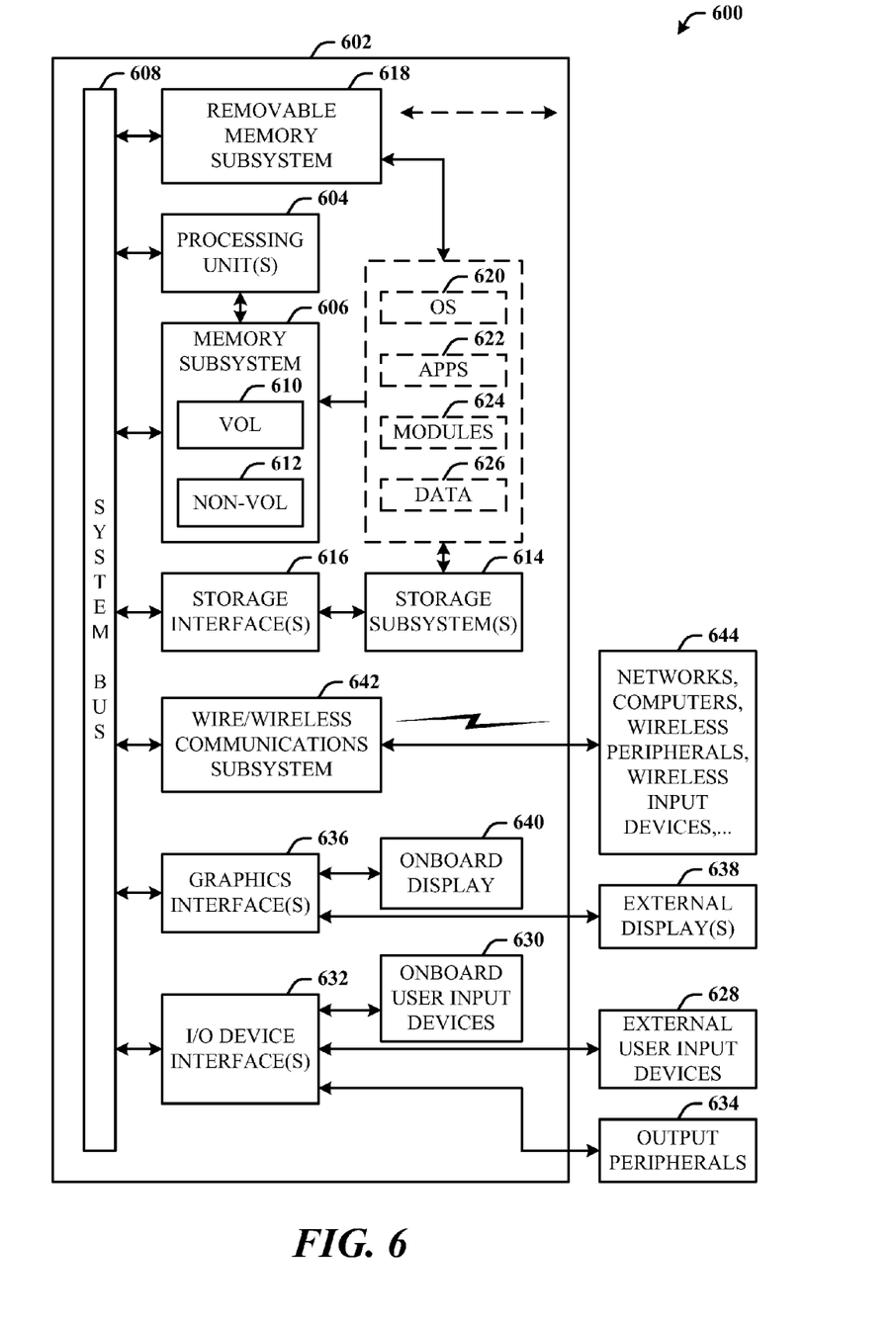
FIG. 6 illustrates a block diagram of a computing system that provides security in accordance with the disclosed architecture.

Referring now to FIG. 6, there is illustrated a block diagram of a computing system 600 that provides security in accordance with the disclosed architecture. In order to provide additional context for various aspects thereof, FIG. 6 and the following description are intended to provide a brief, general description of the suitable computing system 600 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 600 for implementing various aspects includes the computer 602 having processing unit(s) 604, a computer-readable storage such as a system memory 606, and a system bus 608. The processing unit(s) 604 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 606 can include computer-readable storage (physical storage media) such as a volatile (VOL) memory 610 (e.g., random access memory (RAM)) and non-volatile memory (NON-VOL) 612 (e.g., ROM, EPROM, EEPROM, etc.). A basic input/output system (BIOS) can be stored in the non-volatile memory 612, and includes the basic routines that facilitate the communication of data and signals between components within the computer 602, such as during startup. The volatile memory 610 can also include a high-speed RAM such as static RAM for caching data.

The system bus 608 provides an interface for system components including, but not limited to, the system memory 606 to the processing unit(s) 604. The system bus 608 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 602 further includes machine readable storage subsystem(s) 614 and storage interface(s) 616 for interfacing the storage subsystem(s) 614 to the system bus 608 and other desired computer components. The storage subsystem(s) 614 (physical storage media) can include one or more of a hard disk drive (HDD), a magnetic floppy disk drive (FDD), and/or optical disk storage drive (e.g., a CD-ROM drive DVD drive), for example. The storage interface(s) 616 can include interface technologies such as EIDE, ATA, SATA, and IEEE 1394, for example.

One or more programs and data can be stored in the memory subsystem 606, a machine readable and removable memory subsystem 618 (e.g., flash drive form factor technology), and/or the storage subsystem(s) 614 (e.g., optical, magnetic, solid state), including an operating system 620, one or more application programs 622, other program modules 624, and program data 626.

The one or more application programs 622, other program modules 624, and program data 626 can include the entities and components of the system 100 of FIG. 1, the entities and components of the system 200 of FIG. 2, the entities and components of the diagram 300 of FIG. 3, and the methods represented by the flowcharts of FIGS. 4 and 5, for example.

The computer 602 can function as the user machine 302 (computing host 104), which can operate to include the isolated environment (e.g., virtual machine), the notification information, terminal services window, and so on. The computer 602 also includes the capability to function as the remote computing host 112 (also referred to as the quarantine server 316) in which the isolated environment (e.g., virtual machine) runs to provide access to the desire network sites.

Generally, programs include routines, methods, data structures, other software components, etc., that perform particular tasks or implement particular abstract data types. All or portions of the operating system 620, applications 622, modules 624, and/or data 626 can also be cached in memory such as the volatile memory 610, for example. It is to be appreciated that the disclosed architecture can be implemented with various commercially available operating systems or combinations of operating systems (e.g., as virtual machines).

The storage subsystem(s) 614 and memory subsystems (606 and 618) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 602 and includes volatile and non-volatile internal and/or external media that is removable or non-removable. For the computer 602, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 602, programs, and data using external user input devices 628 such as a keyboard and a mouse. Other external user input devices 628 can include a microphone, an IR (infrared) remote control, a joystick, a game pad, camera recognition systems, a stylus pen, touch screen, gesture systems (e.g., eye movement, head movement, etc.), and/or the like. The user can interact with the computer 602, programs, and data using onboard user input devices 630 such a touchpad, microphone, keyboard, etc., where the computer 602 is a portable computer, for example. These and other input devices are connected to the processing unit(s) 604 through input/output (I/O) device interface(s) 632 via the system bus 608, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 632 also facilitate the use of output peripherals 634 such as printers, audio devices, camera devices, and so on, such as a sound card and/or onboard audio processing capability.

One or more graphics interface(s) 636 (also commonly referred to as a graphics processing unit (GPU)) provide graphics and video signals between the computer 602 and external display(s) 638 (e.g., LCD, plasma) and/or onboard displays 640 (e.g., for portable computer). The graphics interface(s) 636 can also be manufactured as part of the computer system board.

The computer 602 can operate in a networked environment (e.g., IP-based) using logical connections via a wired/wireless communications subsystem 642 to one or more networks and/or other computers. The other computers can include workstations, servers, routers, personal computers, microprocessor-based entertainment appliances, peer devices or other common network nodes, and typically include many or all of the elements described relative to the computer 602. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 602 connects to the network via a wired/wireless communication subsystem 642 (e.g., a network interface adapter, onboard transceiver subsystem, etc.) to communicate with wired/wireless networks, wired/wireless printers, wired/wireless input devices 644, and so on. The computer 602 can include a modem or other means for establishing communications over the network. In a networked environment, programs and data relative to the computer 602 can be stored in the remote memory/storage device, as is associated with a distributed system. It will be appreciated that the network connections shown are exemplary and other means of establishing a communications link between the computers can be used.

The computer 602 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented security system having a processor and a computer readable storage device that stores executable instructions executed by the processor, the computer readable storage device comprising:
   a compliance component that monitors a computing host for incompliant operations and state when attempting to access a network entity and detects an incompliant computing host;
   an isolation component that automatically creates an isolated environment in response to detection of the computing host being an incompliant computing host, the determination of the compliance component being an incompliant computing host made by the compliance component, the isolated environment created in association with a remote computing host; and
   an access component that facilitates monitored interactive access with the network entity via the isolated environment of the remote computing host, the access component automatically and transparently routes a user of the incompliant host to the isolated environment for temporary access to the network entity.

2. The system of claim 1, wherein the isolated environment is created temporarily for access to the network entity via the access component, and the isolated environment is destroyed when the access is no longer requested.

3. The system of claim 2, wherein the incompliant computing host is blocked from establishing a connection to another computing host and a network.

4. The system of claim 1, wherein the isolation component creates the isolated environment within a predetermined time of when the compliance component determines the computing host to be the incompliant computing host.

5. The system of claim 1, wherein the compliance component determines incompliance of the computing host based on at least one of gateway access policies, security reputation of the network entity, or characteristics of the remote computing host.

6. The system of claim 1, further comprising a monitored communications channel implemented between the incompliant computing host and the isolation environment for monitoring and transferring content between the incompliant computing host and the isolated environment.

7. The system of claim 1, wherein the remote computing host is a gateway that hosts the isolated environment.

8. The system of claim 1, wherein the remote computing host is a client machine that receives a virtual desktop pre-provisioned to a user.

9. The system of claim 1, wherein the isolated environment receives a restricted set of file types from the incompliant computing host for interacting with the network entity via a terminal service.

10. A computer-implemented security system having a processor and a computer readable storage device that stores executable instructions executed by the processor, the computer readable storage device comprising:
   a compliance component that monitors a computing host for incompliant operations and state when attempting to access a network entity and detects an incompliant computing host;
   an isolation component that automatically creates an isolated environment in response to detection of the computing host being an incompliant computing host, the isolated environment created in association with a remote computing host, the determination of the compliance component being an incompliant computing host made by the compliance component;
   a monitored communications channel implemented between the incompliant computing host and the isolated environment for monitoring and transferring content between the incompliant computing host and the isolated environment; and
   an access component that automatically and transparently routes a user of the computing host to the isolated environment to facilitate interactive access with the network entity.

11. The system of claim 10, wherein the isolated environment is created temporarily for access to the network entity, and the isolated environment is destroyed when the access is no longer requested.

12. The system of claim 10, wherein the incompliant computing host is blocked from establishing a connection to another computing host, the incompliant computing host sends a restricted set of file types to the remote computing host for processing to access the network entity and the file types are inspected for malware and content compliance.

13. The system of claim 10, wherein the isolation component creates the isolated environment within a predetermined time of when the compliance component determines the computing host to be the incompliant computing host.

14. The system of claim 10, further comprising a notification component that presents a notification of incompliance and an embedded remote desktop window for accessing the isolated environment and interacting with the network entity via the isolated environment.

15. A computer-implemented security method executed by a processor, comprising:
   monitoring a computing host for incompliant operations and state;
   detecting the computing host as being an incompliant computing host;
   creating a temporary isolated environment in association with a remote host in response to detection of the computing host as being an incompliant computing host;
   moving files to the isolated environment that facilitate completion of tasks associated with a network entity;
   automatically and transparently routing a user of the incompliant host to the isolated environment for temporary access to the network entity; and
   processing the tasks on the network entity from the incompliant computing host via the isolated environment.

16. The method of claim 15, further comprising establishing a monitored communications channel between the incompliant computing host and the remote host via which to interact with the network entity.

17. The method of claim 15, further comprising presenting a terminal service port on the incompliant computing host via which to run an application in the isolated environment to interact with the network entity.

18. The method of claim 15, further comprising automatically switching from operations of the incompliant computer host to operations in the isolated environment.

19. The method of claim 15, further comprising closing the isolated environment after access to the network entity stops.

20. The method of claim 15, further comprising presenting a notification of incompliance and an embedded remote desktop window for accessing the isolated environment and interacting with the network entity via the isolated environment.

* * * * *